US009309804B2

(12) United States Patent
Chadwell et al.

(10) Patent No.: US 9,309,804 B2
(45) Date of Patent: Apr. 12, 2016

(54) DUAL PATH (LOW PRESSURE LOOP AND HIGH PRESSURE LOOP) EGR FOR IMPROVED AIR BOOSTING EFFICIENCY

(71) Applicant: Southwest Research Institute, San Antonio, TX (US)

(72) Inventors: Christopher J. Chadwell, San Antonio, TX (US); Terrence F. Alger, II, San Antonio, TX (US); Shinhyuk Joo, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 13 days.

(21) Appl. No.: 13/830,496

(22) Filed: Mar. 14, 2013

(65) Prior Publication Data

US 2014/0260242 A1 Sep. 18, 2014

(51) Int. Cl.
| F02B 33/44 | (2006.01) |
| F02B 47/08 | (2006.01) |
| G06F 17/00 | (2006.01) |
| F02B 37/12 | (2006.01) |
| F02B 29/04 | (2006.01) |

(52) U.S. Cl.
CPC ............... *F02B 37/12* (2013.01); *F02B 29/04* (2013.01); *Y02T 10/121* (2013.01); *Y02T 10/144* (2013.01)

(58) Field of Classification Search
CPC ............ F02M 25/071; F02M 25/0709; F02M 25/0706; F02M 25/0704; F02B 37/00; F02D 23/00; Y02T 10/144
USPC .............. 60/605.2, 611; 123/568.11; 701/108
See application file for complete search history.

(56) References Cited

U.S. PATENT DOCUMENTS

| 6,899,090 | B2 * | 5/2005 | Arnold ....................... 123/568.2 |
| 7,043,914 | B2 * | 5/2006 | Ishikawa ....................... 60/605.2 |
| 7,801,669 | B2 * | 9/2010 | Nagae ............................. 701/108 |
| 7,836,693 | B2 * | 11/2010 | Fujita et al. .................... 60/605.2 |
| 8,001,779 | B2 * | 8/2011 | Styles ........................... 60/605.2 |
| 8,453,446 | B2 * | 6/2013 | Onishi et al. .................. 60/605.2 |
| 2004/0050375 | A1 * | 3/2004 | Arnold .......................... 60/605.2 |
| 2006/0236693 | A1 * | 10/2006 | Wei et al. ...................... 60/605.2 |
| 2010/0000500 | A1 * | 1/2010 | Shimizu et al. .............. 60/605.2 |
| 2011/0289918 | A1 * | 12/2011 | Wada ............................ 60/605.2 |
| 2012/0180479 | A1 * | 7/2012 | Beil et al. ..................... 60/605.2 |

FOREIGN PATENT DOCUMENTS

| DE | 2614956 | B1 * | 5/1978 | .............. F02B 37/04 |
| DE | 102007038242 | A1 * | 2/2009 | .............. F02M 25/07 |
| DE | 102011107250 | A1 * | 1/2012 | .............. F02D 23/00 |
| EP | 1420159 | A2 * | 5/2004 | .............. F02M 25/07 |
| EP | 2075450 | A1 * | 7/2009 | .............. F02M 25/07 |
| FR | 2921122 | A3 * | 3/2009 | .............. F02M 25/07 |
| GB | 2475317 | A  * | 5/2011 | .............. F02D 41/00 |

* cited by examiner

*Primary Examiner* — Jorge Pereiro
*Assistant Examiner* — Ngoc T Nguyen
(74) *Attorney, Agent, or Firm* — Livingston Law Firm

(57) ABSTRACT

A method of providing exhaust gas recirculation (EGR) to an air-boosted internal combustion engine. The engine has both a high pressure EGR loop and a low pressure EGR loop. Each EGR loop has a valve that controls the amount of EGR that is delivered to the engine intake from that loop. During low-speed engine conditions, more EGR is delivered to the engine intake from the low pressure EGR loop than from the high pressure EGR loop. During high-speed engine conditions, more EGR is delivered to the engine intake from the high pressure EGR loop than from the low pressure EGR loop.

13 Claims, 4 Drawing Sheets

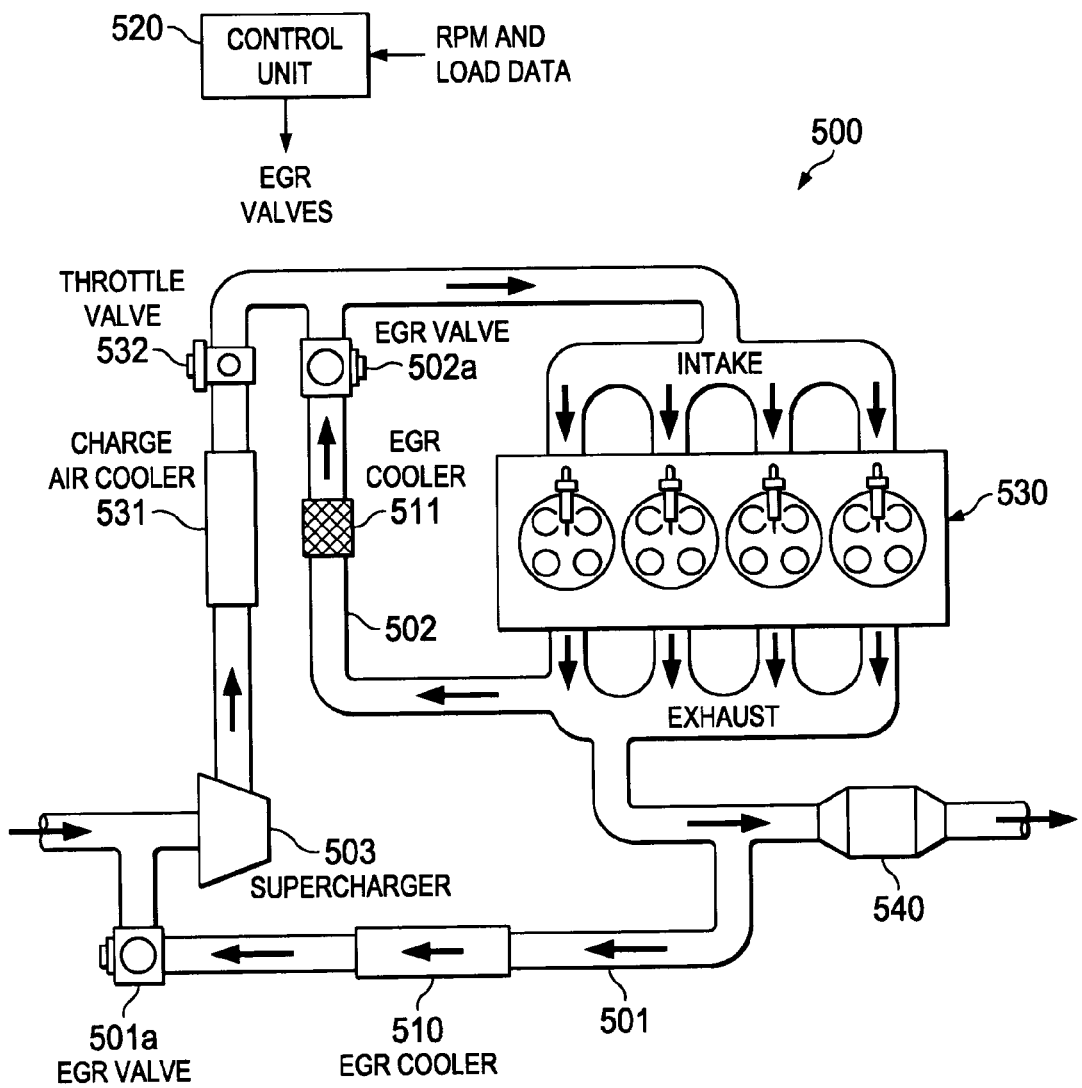

DUAL PATH (LOW PRESSURE LOOP AND HIGH PRESSURE LOOP) EGR FOR IMPROVED AIR BOOSTING EFFICIENCY

TECHNICAL FIELD OF THE INVENTION

This invention relates to exhaust gas recirculation systems, and more particularly to a method of operating an EGR system having both a low pressure loop and a high pressure loop.

BACKGROUND OF THE INVENTION

Exhaust gas recirculation (EGR) is a technology used with internal combustion engines, and in the case of gasoline engines, is primarily used to improve engine efficiency. EGR works by recirculating a portion of an engine's exhaust gas back to the engine cylinders. The recirculated exhaust, added to the fuel, oxygen, and combustion products, increases the specific heat capacity of the cylinder contents, which lowers the adiabatic flame temperature. In a gasoline engine, the recirculated exhaust displaces the amount of combustible matter in the cylinder.

For a gasoline engine, a properly operating cooled EGR system improves the knock tolerance of the engine, which allows improved combustion phasing and increased compression ratio. The combined effect of the improved phasing and compression ratio improves efficiency and reduces fuel consumption.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 illustrates a dual path EGR system, like the system of FIG. 2, but with a supercharger rather than a turbocharger.

DETAILED DESCRIPTION OF THE INVENTION

The following description is directed to a system and method of providing exhaust gas recirculation (EGR) to a gasoline engine. The system and method are used with internal combustion engines having a boosted air intake, such as is accomplished with a turbocharger or supercharger.

The EGR system has both a high pressure loop (HPL) and a low pressure loop (LPL). Depending on engine operating conditions, the EGR from the two loops may be delivered to the engine alternatively, or blended in a controlled manner to maximize the efficiency of the engine's intake air boosting system. The particular method of providing EGR described herein is referred to as a "dual path EGR" method.

In the example of this description, the dual path EGR method is used with a gasoline direct injection (GDI) internal combustion engine. For these engines, the gasoline is highly pressurized, and is injected via a common rail fuel line directly into the combustion chamber of each cylinder. However, the same concepts could be applied to other air-boosted internal combustion engines, such as an air-boosted multi-point fuel injection engine.

The method and system described herein address certain problems presented with the use of EGR in an air-boosted engine. By "air-boosted" engine is meant a forced induction engine, in which a mechanically driven supercharger, or an exhaust-driven turbocharger, is used to increase the mass of intake air beyond what could be introduced by atmospheric pressure.

In conventional engine systems, one problem encountered with the use of EGR is that the EGR is added on top of the fresh air intake required by the engine. The EGR increases the pressure ratio in the intake manifold for a given load. In a turbocharged engine, this increases the power required to drive the turbocharger's compressor. At the same time, the EGR dilutes the combustion process and reduces the exhaust temperature, which then requires an increase in exhaust manifold pressure (reduction in turbine size) to extract sufficient energy from the turbine. The result is a mismatch in compressor and turbine size and poor turbocharger efficiency. The dual path EGR system and method described herein minimize the effects of this problem by maintaining efficient compressor operation.

Figure 1:
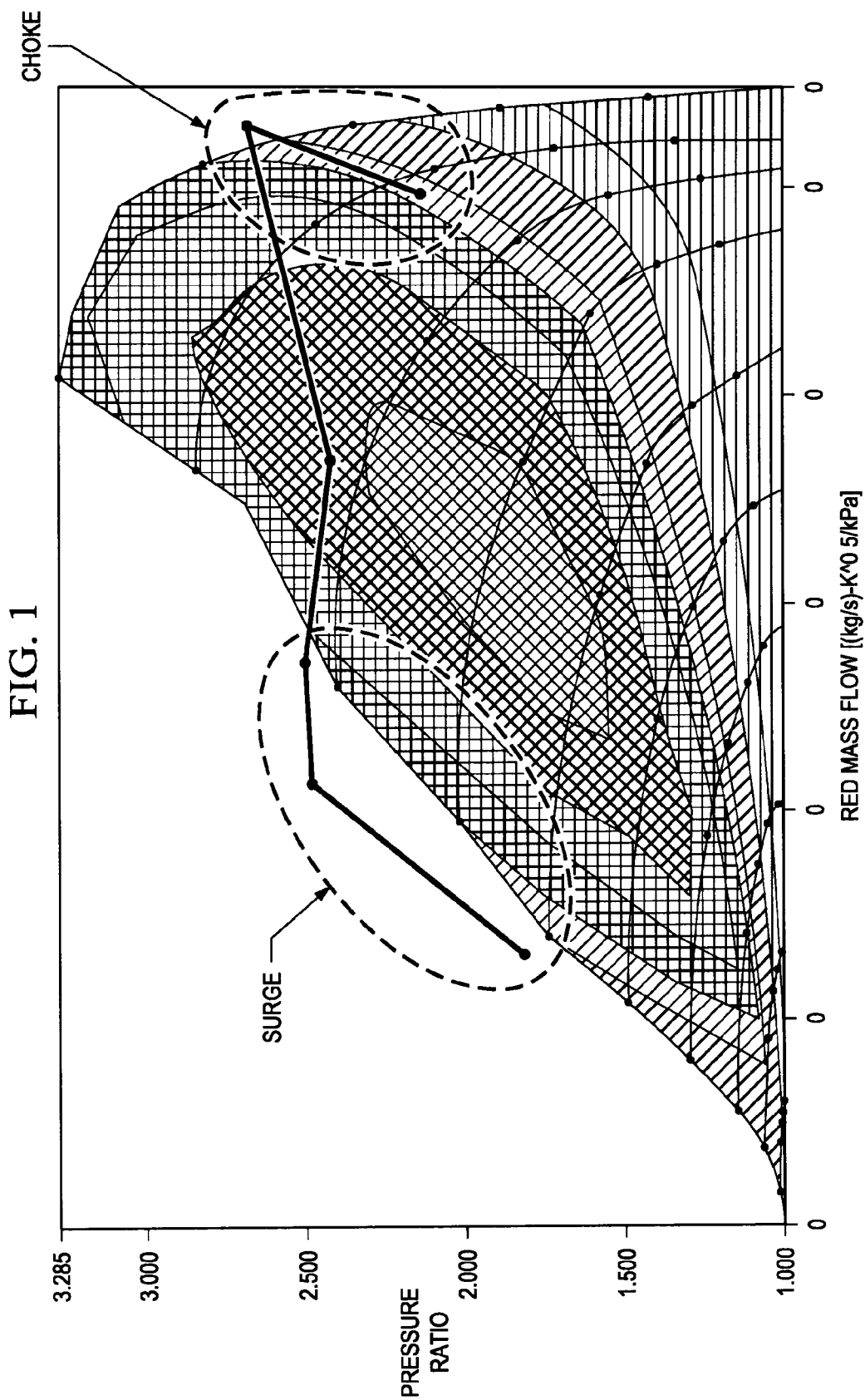
FIG. 1 is an example of a compressor operating map for a compressor used in an engine having exhaust gas recirculation.

FIG. 1 is an example of a compressor operating map, and illustrates another problem with an air-boosted EGR engine. In FIG. 1, the operating points are required for 20 bar BMEP (brake mean effective pressure) from 1500 to 4000 rpm with 25% LPL EGR. The efficiency contours as well as the surge and choke lines are shown. High intake manifold pressure, and therefore the turbocharger compressor pressure ratio, causes the compressor to operate on the upper part of the map. The problem with this is that the map narrows, and the margin between surge and choke is reduced. The low engine speed points exceed the surge line on the left of the map, and the high engine speed points exceed the choke line on the right of the map.

Figure 2:
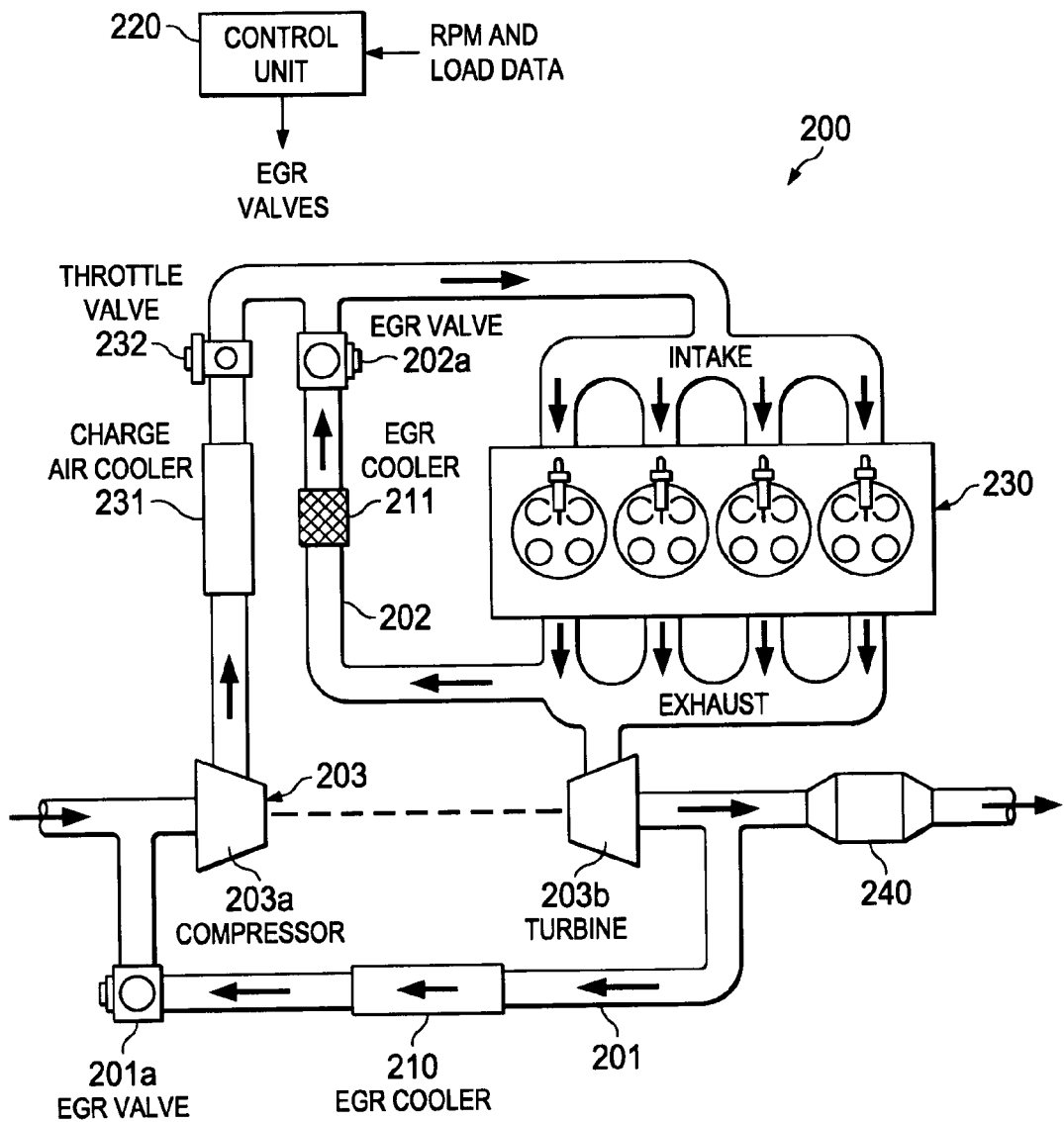
FIG. 2 illustrates an engine system equipped with both an EGR low pressure loop (LPL) and an EGR high pressure loop (HPL).

FIG. 2 illustrates an engine system 200 equipped with both an EGR low pressure loop (LPL) 201 and an EGR high pressure loop (HPL) 202. As described below, this "dual path" EGR configuration allows control of the ratio of HPL and LPL concentrations, and alleviates the above-described problems.

Engine 230 is a spark-ignited gasoline engine. The intake fresh air is directed to a cooler 231 and throttle 232, which may operate in a conventional manner.

The exhaust from the engine 230 may be treated with any suitable exhaust system. In the example of FIG. 2, the exhaust aftertreatment system is represented generally as one or more emissions control devices 240.

In the low pressure loop (LPL) 201, the exhaust to be recirculated is extracted downstream of the turbine 203b and introduced to the engine inlet upstream of the compressor 203a. In the high pressure loop (HPL) 202, the exhaust to be recirculated is extracted upstream of the turbine 203b and routed to the engine intake downstream of the compressor 203a.

One feature of the dual path EGR system is that the two EGR loops 201 and 202 are both cooled. Both the LPL 201 and HPL 202 use a cooler, such as EGR coolers 210 and 211, respectively. These coolers 210 and 211 cool the recirculated exhaust gas prior to the gas being reintroduced into the engine. In addition, to keep intake temperatures low, the HPL EGR is routed downstream charge air cooler 231.

The EGR coolers 210 and 211 may be one of various types of liquid or air exchange coolers, such as liquid-to-liquid or gas-to-liquid heat exchanger type coolers. For example, the EGR cooler may run hot exhaust gasses through channels while allowing liquid coolant to run on the outside of those channels. Commonly used types of EGR coolers are water-cooled and air-cooled coolers.

Turbocharger 203 comprises a turbine 203a and compressor 203b. As explained below, an advantage of the dual loop EGR system is that the performance characteristics of turbocharger 203 can be well matched to the engine. This results in improved load potential (higher BMEP), an expansion of the engine speed range while maintaining high BMEP, and improved efficiency of the turbocharger and engine.

More specifically, compressor 203a is matched to provide an appropriate pressure ratio at low engine speeds with LPL EGR. In a conventional (non dual path EGR) engine, this would compromise the engine's load potential at high engine speeds due to the high mass flow requirement at those speeds. However, using dual path EGR, at higher engine speeds, progressively more recirculated exhaust gas is transitioned from LPL EGR to HPL EGR to reduce the mass flow requirement on the compressor and to provide more margin before compressor choke is observed.

The smaller turbine required to meet the load requirement at low engine speeds is undersized for high speed operation. At high speeds, the dual path EGR system reduces some or all of the EGR flow through the turbine, and allows a higher percentage of the exhaust flow to go through the turbine instead of the wastegate. This further improves the effective efficiency of the turbocharger.

Both the LPL and the HPL have a valve 201a and 202a, respectively. For the HPL, valve 202a can be placed as close to turbine 203b as practicable, to minimize pre-turbine volume.

Valves 201a and 202a are controlled by control unit 220, which has appropriate processing and memory devices and programming to implement the method described herein.

As described below, control of the EGR system is performed in a way that maximizes the boosting system efficiency. Using valves 201a and 202a, at full engine loads, the relative amounts of LPL and HPL EGR are a continuum between full LPL EGR at low engine speeds to mostly (or all) HPL EGR at high engine speeds.

In some embodiments, turbocharger 203 may be implemented with a twin scroll turbine, which has two exhaust paths from the exhaust manifold to the turbine wheel. In this configuration, it may be advantageous to use a valve on the "hot side" of each path.

Control unit 220 may be dedicated to EGR control or may be part of a more comprehensive engine control unit (ECU). Tasks of control unit 19 relevant to this description may include control of EGR coolers 210 and 211, EGR valves 201a and 202a, and control of other aspects of the EGR process used to provide recirculated exhaust at a desired rate and temperature.

Figure 3:
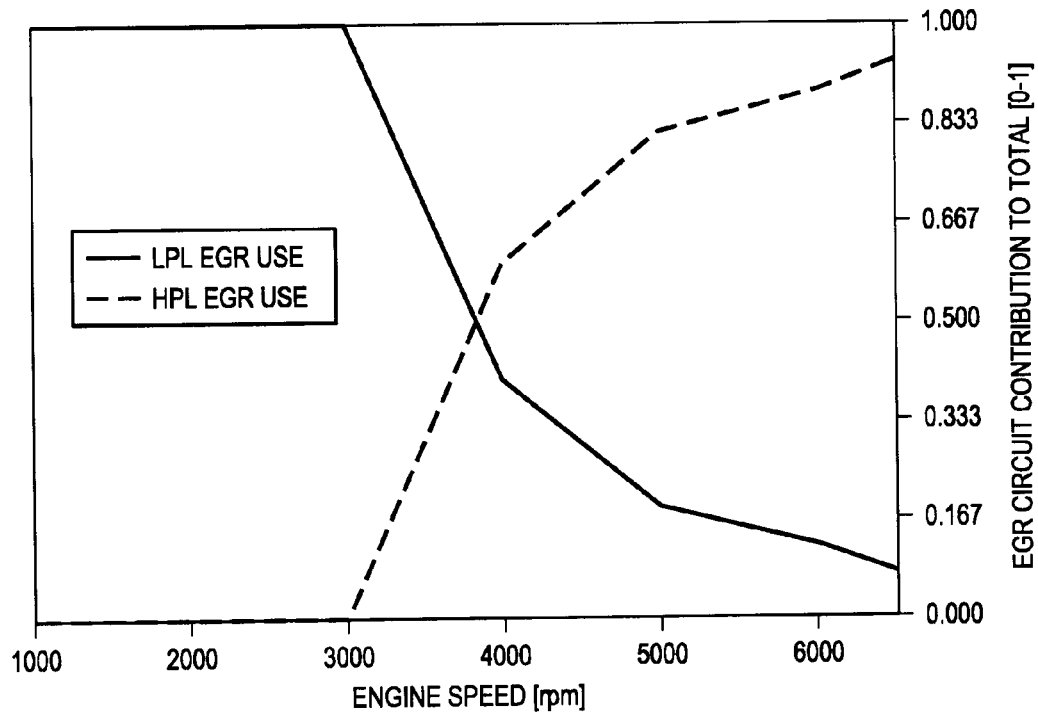
FIG. 3 illustrates operation of the dual loop EGR system at full load.

FIG. 3 illustrates operation of the dual loop EGR system at full engine load. The overall EGR rate is kept constant, and for example, may be maintained at 25% EGR exhaust gas. This means that 25% of the intake air is EGR exhaust gas and the remaining portion is fresh air.

In the example of FIG. 3, "low speed" is less than 3000 rpm and "high speed" is over 6500 rpm, but the exact cutoffs may vary with different engines. Also, "full load" is generally considered to be from 40% load and up". "Part-load" is considered to be when the engine is throttled or below 40% load. Again, the exact cutoff between full and part load may vary with different engines.

At low-speed full-load operating conditions, all recirculated exhaust gas is from the LPL 201. This retains a positive pressure difference and scavenging capability.

At high-speed full-load conditions, all recirculated exhaust gas is from the HPL 202. Exhaust may be "wastegated" through the HPL such that mass flow through the compressor is decreased. This relieves compressor choke and increases turbine efficiency.

At mid-speed full-load conditions, both LPL EGR and HPL EGR are used, with the flow balanced to maintain the 25% EGR rate. The total dilution balance is maintained at a constant level by appropriate design of the HPL 202.

Figure 4:
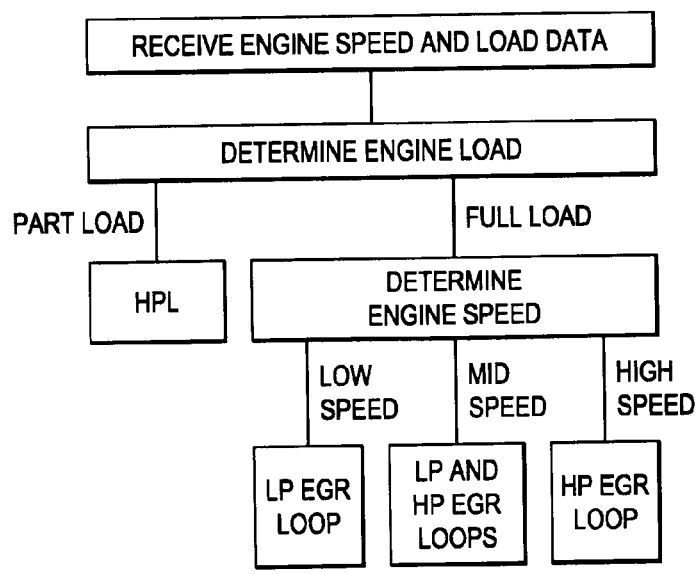
FIG. 4 further illustrates operation of the dual loop EGR system at full load and also at part load.

FIG. 4 further illustrates operation of the dual path EGR system, both at full and part load engine conditions. Full load operation is in accordance with the control strategy described above in connection with FIG. 3.

In part-load conditions, the HPL 202 is used so that the natural vacuum in the intake manifold from throttling can efficiently pull recirculated exhaust gas through the system. In general, this part-load strategy is applied regardless of engine speed. This keeps recirculated exhaust gas out of the LPL 201, and thus avoids choking the compressor.

As used herein, "load" is used in the conventional sense to denote when the engine is doing work. The engine's current engine load may be measured as a percentage of BMEP (brake mean effective pressure). Engine system 200 is assumed to have appropriate sensors and control unit 220 is assumed to have appropriate stored data and programming to determine the engine's speed (rpm) and load for purposes of controlling EGR valves 201a and 202a.

Referring to both FIGS. 2 and 4, inputs to control unit 220 include data representing the engine's current rpm and load. Control unit 220 stores data defining high-speed, mid-speed, and low-speed engine conditions, so that during engine operation, current engine speed input data can be mapped to the appropriate EGR balance, and valves controlled accordingly. Similarly, control unit 220 stores data defining part load and full load engine conditions, so that current engine load input data can be mapped to the appropriate EGR balance, and valves controlled accordingly. Control unit 220 calculates, or refers to stored data, to adjust the relative amounts of recirculated exhaust gas from the HPL and LPL so that a constant overall EGR rate is maintained.

Referring again to FIG. 1, the flow range of a turbocharger is limited by choke and surge. This constrains the ability to operate the engine with a wide range of engine speeds, high loads, and high levels of recirculated exhaust gas. The above-described method allows a turbocharger to be matched to flow LPL at low engine speeds, and then as the compressor nears the choke limit, the EGR is transitioned to the HPL. This keeps the EGR flow from going though the compressor and keeps it from choking. As a result, engine performance goals are met with a single boosting device (turbocharger). In the absence of the method, performance goals have relied on two stage boosting to achieve the same combination of range, BMEP, and EGR.

FIG. 5 illustrates a dual path EGR system 500, like system 200 of FIG. 2, but with a supercharger 503 rather than a turbocharger. Like system 200, system 500 has a LPL 501 and a HPL 502. The low pressure EGR loop 501 directs exhaust gas from a point at or downstream the exhaust manifold to a point on the air intake line upstream the supercharger. The high pressure EGR loop 502 directs exhaust gas from a point at or downstream the exhaust manifold to a point on the air intake line between the supercharger and the intake manifold.

All other elements are analogous to those of FIG. 2. The operation of system 500 is the same as that of system 200 as described above.

Another benefit of the dual path EGR method described herein is that is allows higher BMEP operation at high engine speeds by optimizing the pressure differential across the cylinder head and reducing the level of internal residuals, enabling a greater degree of downsizing and improved vehicle fuel consumption. The use of blended EGR will enable the application of smaller sized turbocharger units while maintaining the required torque curve, improving transient response and yielding more downspeeding potential. The use of blended EGR and a smaller turbocharger unit will increase the positive pressure gradient on the cylinder head at low engine speeds, increasing the level of scavenging and improving the knock resistance of the engine. The improved knock resistance will allow an increase in compression ratio and improved efficiency. The increase in the level of scavenging and reduction in knock will also lead to improved combustion phasing at high torque levels, increasing engine efficiency at these conditions. The use of blended EGR will result in the ability of the engine to meet the full load torque curve required while only using one boost stage, resulting in a lower thermal mass in the exhaust and improving cold-start emissions. This system could potentially significantly improve the ability of the engine to meet future emissions standards.

What is claimed is:

1. A method of providing exhaust gas recirculation (EGR) to an internal combustion engine having a single turbocharger, the turbocharger having a compressor and a turbine, the engine further having a main exhaust line, an exhaust manifold, and an intake manifold, the method comprising:
   providing a high pressure EGR loop and a low pressure EGR loop that are both in communication with fresh air into or from only the compressor, with the high pressure EGR loop mixing fresh air with recirculated exhaust downstream the compressor and the low pressure EGR loop mixing fresh air with recirculated exhaust upstream the compressor;
   wherein the high pressure EGR loop directs exhaust gas from the exhaust from a point on the main exhaust line between the exhaust manifold and the turbine to a point on the air intake line between the compressor and the intake manifold, the high pressure EGR loop having a high pressure EGR loop valve for controlling flow of recirculated exhaust though the high pressure EGR loop;
   wherein the low pressure EGR loop directs exhaust gas from the exhaust from a point on the main exhaust line downstream of the turbine to a point on the air intake line upstream the compressor, the low pressure EGR loop having a low pressure EGR loop valve for controlling flow of recirculated exhaust though the low pressure EGR loop;
   providing a controller programmed to store data defining a low speed range, a mid-speed range, and a high-speed range of revolutions per minute (rpm) of the engine at full load, thereby defining low-speed, mid-speed and high-speed engine conditions;
   wherein the controller is programmed to receive data representing engine load and engine speed, to determine whether the engine is operating at full load or part load engine conditions, and to control the low pressure EGR loop valve and the high pressure EGR loop valve such that:
   during low-speed full load engine conditions, directing all recirculated exhaust gas through the low pressure EGR loop;
   during mid-speed full load engine condition, directing recirculated exhaust gas through both the low pressure EGR loop and the high pressure EGR loop; and
   during high-speed full load and during part load engine conditions, directing all recirculated exhaust gas through the high pressure EGR loop.

2. The method of claim 1, further comprising determining a full load range and part load range of engine load conditions of the engine, and directing exhaust only through the high pressure EGR loop at part load.

3. The method of claim 1, wherein the compressor provides an operating pressure ratio at low engine speeds with recirculated exhaust gas provided only by the low pressure EGR loop.

4. The method of claim 1, wherein the overall EGR rate is maintained at a constant value.

5. The method of claim 1, further providing coolers on both the high pressure EGR loop and the low pressure EGR loop.

6. An exhaust gas recirculation (EGR) system for an internal combustion engine having a supercharger, the supercharger having a compressor and a turbine, the engine further having a main exhaust line, an exhaust manifold, and an intake manifold, the method comprising:
   a high pressure EGR loop and a low pressure EGR loop that are both in communication with fresh air into or from only the compressor, with the high pressure EGR loop mixing fresh air with recirculated exhaust downstream the compressor and the low pressure EGR loop mixing fresh air with recirculated exhaust upstream the compressor;
   wherein the high pressure EGR loop directs exhaust gas from the exhaust from a point on the main exhaust line at or downstream the exhaust manifold to a point on the air intake line between the supercharger and the intake manifold;
   wherein the low pressure EGR loop directs exhaust gas from the exhaust from a point on the main exhaust line to a point on the air intake line upstream of the supercharger;
   a high pressure EGR loop valve for controlling the amount of EGR delivered to the intake of the engine from the high pressure EGR loop;
   a low pressure EGR loop valve for controlling the amount of EGR delivered to the intake of the engine from the low pressure EGR loop;
   a controller that stores data defining a low speed range, mid-speed range and high-speed range of revolutions per minute (rpm) of the engine at full load; and is programmed to receive data representing engine speed and engine load, and to determine whether the engine is operating at full load or part load engine conditions; and is further programmed to control the high pressure EGR loop valve and the low pressure EGR loop valve such that during low-speed full-load engine conditions, recirculated exhaust gas is directed to the intake from the low pressure EGR loop, and such that during high-speed full-load engine conditions, all recirculated exhaust gas is directed to the intake from the high pressure EGR loop, and such that during mid-speed full-load engine conditions recirculated exhaust gas is directed through both the low pressure EGR loop and the high pressure EGR loop.

7. An exhaust gas recirculation (EGR) system for an internal combustion engine having a single turbocharger, the turbocharger having a compressor and a turbine, the engine further having a main exhaust line, an exhaust manifold, and an intake manifold, the method comprising:

a high pressure EGR loop and a low pressure EGR loop that are both in communication with fresh air into or from only the compressor, with the high pressure EGR loop mixing fresh air with recirculated exhaust downstream the compressor and the low pressure EGR loop mixing fresh air with recirculated exhaust upstream the compressor;

wherein the high pressure EGR loop directs exhaust gas from the exhaust from a point on the main exhaust line between the exhaust manifold and the turbine to a point on the air intake line between the compressor and the intake manifold;

wherein the low pressure EGR loop directs exhaust gas from the exhaust from a point on the main exhaust line downstream the turbine to a point on the air intake line upstream the compressor;

a high pressure EGR loop valve for controlling the amount of recirculated exhaust gas delivered to the intake of the engine from the high pressure EGR loop;

a low pressure EGR loop valve for controlling the amount of recirculated exhaust gas delivered to the intake of the engine from the low pressure EGR loop;

a controller that stores data defining a low speed range, mid-speed range and high-speed range of revolutions per minute (rpm) of the engine at full load; and is programmed to receive data representing engine speed and engine load, and to determine whether the engine is operating at full load or part load engine conditions; and is further programmed to control the high pressure EGR loop valve and the low pressure EGR loop valve such that during low-speed full-load engine conditions, all recirculated exhaust gas is directed to the intake from the low pressure EGR loop, and such that during high-speed full-load and during part-load engine conditions, all recirculated exhaust gas is directed to the intake from the high pressure EGR loop, and such that during mid-speed full-load engine conditions recirculated exhaust gas is directed through both the low pressure EGR loop and the high pressure EGR loop.

8. The system of claim 7, wherein the controller further stores data defining full load conditions and part load conditions, and is further programmed to receive data representing load conditions, and to control the valves such that during part load conditions substantially all recirculated exhaust gas delivered to the engine intake is from the high pressure EGR loop.

9. The system of claim 7, wherein the controller further stores data defining a mid-speed range of revolutions per minute (rpm) of the engine at full load; and during mid-speed engine conditions, and is further programmed to control the valves to direct exhaust through both the low pressure and high pressure EGR loops during mid-speed engine conditions.

10. The system of claim 7, wherein the compressor provides an operating pressure ratio at low engine speeds with recirculated exhaust gas provided only by the low pressure EGR loop.

11. The system of claim 7, wherein the controller is further programmed to control the amount of recirculated exhaust gas from the high pressure EGR loop and the low pressure EGR loop such that the overall EGR rate remains constant.

12. The system of claim 7, further comprising a cooler on the low pressure EGR loop.

13. The system of claim 7, further comprising a cooler on the high pressure EGR loop.

* * * * *